(12) United States Patent
Dawson et al.

(10) Patent No.: US 7,441,241 B2
(45) Date of Patent: Oct. 21, 2008

(54) GRID NON-DETERMINISTIC JOB SCHEDULING

(75) Inventors: Christopher James Dawson, Arlington, VA (US); Craig William Fellenstein, Brookfield, CT (US); Rick Allen Hamilton, II, Charlottesville, VA (US); Joshy Joseph, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 10/850,387

(22) Filed: May 20, 2004

(65) Prior Publication Data

US 2005/0262506 A1 Nov. 24, 2005

(51) Int. Cl.
G06F 9/46 (2006.01)
G06F 15/16 (2006.01)
G06F 15/173 (2006.01)

(52) U.S. Cl. .............. 718/102; 718/104; 718/105; 709/201; 709/203; 709/223; 709/226

(58) Field of Classification Search ......... 718/100–108; 709/201–226
See application file for complete search history.

(56) References Cited

U.S. PATENT DOCUMENTS

| | | | | |
|---|---|---|---|---|
| 5,093,794 A * | 3/1992 | Howie et al. | ............... | 700/100 |
| 5,524,077 A | 6/1996 | Faaland et al. | ............. | 364/402 |
| 6,014,760 A | 1/2000 | Silva et al. | .................... | 714/46 |
| 6,035,278 A | 3/2000 | Mansour | ........................ | 705/9 |
| 6,101,508 A * | 8/2000 | Wolff | ........................ | 709/223 |
| 6,128,642 A * | 10/2000 | Doraswamy et al. | ........ | 709/201 |
| 6,289,296 B1 | 9/2001 | Umeno | ........................... | 703/2 |
| 6,381,586 B1 | 4/2002 | Glasserman et al. | .......... | 705/36 |
| 6,480,470 B1 | 11/2002 | Breivik | ........................ | 370/252 |
| 6,502,062 B1 | 12/2002 | Acharya et al. | ............ | 702/186 |
| 6,571,391 B1 | 5/2003 | Acharya et al. | ............... | 725/87 |
| 6,578,005 B1 | 6/2003 | Lesaint et al. | .................. | 705/8 |
| 6,775,687 B1 * | 8/2004 | Binding et al. | ............. | 709/203 |
| 6,886,035 B2 * | 4/2005 | Wolff | ......................... | 709/219 |
| 7,010,596 B2 * | 3/2006 | Bantz et al. | ................. | 709/224 |

(Continued)

OTHER PUBLICATIONS

Zhang, "Schedulingalgorithm for Real-Time Applications in Grid Environment", IEEE, 2002, pp. 1-6.*

(Continued)

*Primary Examiner*—Thomas Lee
*Assistant Examiner*—Jennifer N To
(74) *Attorney, Agent, or Firm*—David A. Mims; Rudolf O. Siegesmund; Gordon & Rees, LLP

(57) ABSTRACT

The present invention is method for scheduling jobs in a grid computing environment without having to monitor the state of the resource on the gird comprising a Global Scheduling Program (GSP) and a Local Scheduling Program (LSP). The GSP receives jobs submitted to the grid and distributes the job to the closest resource. The resource then runs the LSP to determine if the resource can execute the job under the conditions specified in the job. The LSP either rejects or accepts the job based on the current state of the resource properties and informs the GSP of the acceptance or rejection. If the job is rejected, the GSP randomly selects another resource to send the job to using a resource table. The resource table contains the state-independent properties of every resource on the grid.

1 Claim, 4 Drawing Sheets

U.S. PATENT DOCUMENTS

| | | | |
|---|---|---|---|
| 7,293,092 B2 * | 11/2007 | Sukegawa | 709/226 |
| 7,340,522 B1 * | 3/2008 | Basu et al. | 709/226 |
| 2003/0065774 A1 * | 4/2003 | Steiner et al. | 709/225 |
| 2004/0215780 A1 * | 10/2004 | Kawato | 709/226 |
| 2005/0071843 A1 * | 3/2005 | Guo et al. | 718/101 |
| 2005/0081208 A1 * | 4/2005 | Gargya et al. | 718/100 |
| 2005/0283782 A1 * | 12/2005 | Lu et al. | 718/100 |
| 2007/0294696 A1 * | 12/2007 | Papakipos et al. | 718/102 |

OTHER PUBLICATIONS

Ferreira et al., "Introduction to Grid Computing With Globus", IBM Redbooks, 2002, pp. 1-310.*

Walker, "A Framework for Effective Scheduling of Data-Parallel Applications in Grid Systems", Thesis Document, University of Virginia, 2001, pp. 1-59.*

Shan et al., "Job Superscheduler Architecture and Performance in Computational Grid Environments", ACM, 2003, pp. 1-15.*

Kidd et al., "Smartnet: A Scheduling Framework for Heterogenous Computing", pp. 514-521.*

Cao et al., "Agent-Based Grid Load Balancing Using Performance-Driven Task Scheduling", IEEE, 2003, pp. 1-10.*

Buyya et al., "Architecture Models for Resource Management in the Grid", Grid 2000, pp. 18-35.*

Buyya, "Economic-Based Distributed Resoruce Management and Scheduling for Grid Computing", Doctor Philosophy, Monash University, 2002, Apges 1-180.*

IBM Redbooks Paper, "Fundamentals of Grid Computing", Berstis, Viktors, 2002.

* cited by examiner

| 122 | 124 | 126 | 128 |
|---|---|---|---|
| RESOURCE ID | PROCESSOR SPEED | MEMORY | OPERATING SYSTEM |
| 1001 | 900 MHz | 128MB | WINDOWS XP |
| 1002 | 1.2 GHz | 256 MB | WINDOWS XP |
| 1003 | 2.0 GHz | 512 MB | WINDOWS NT |
| 1004 | 6.0 GHz | 2.05 GB | WINDOWS NT |

120

| 142 | 144 |
|---|---|
| JOB ID | RESOURCE ID |
| 1042687 | 1003 |
| 1042687 | 1002 |
| 2007468 | 1002 |
| 2007468 | 1001 |
| 2142221 | 1001 |
| 2142221 | 1003 |

140

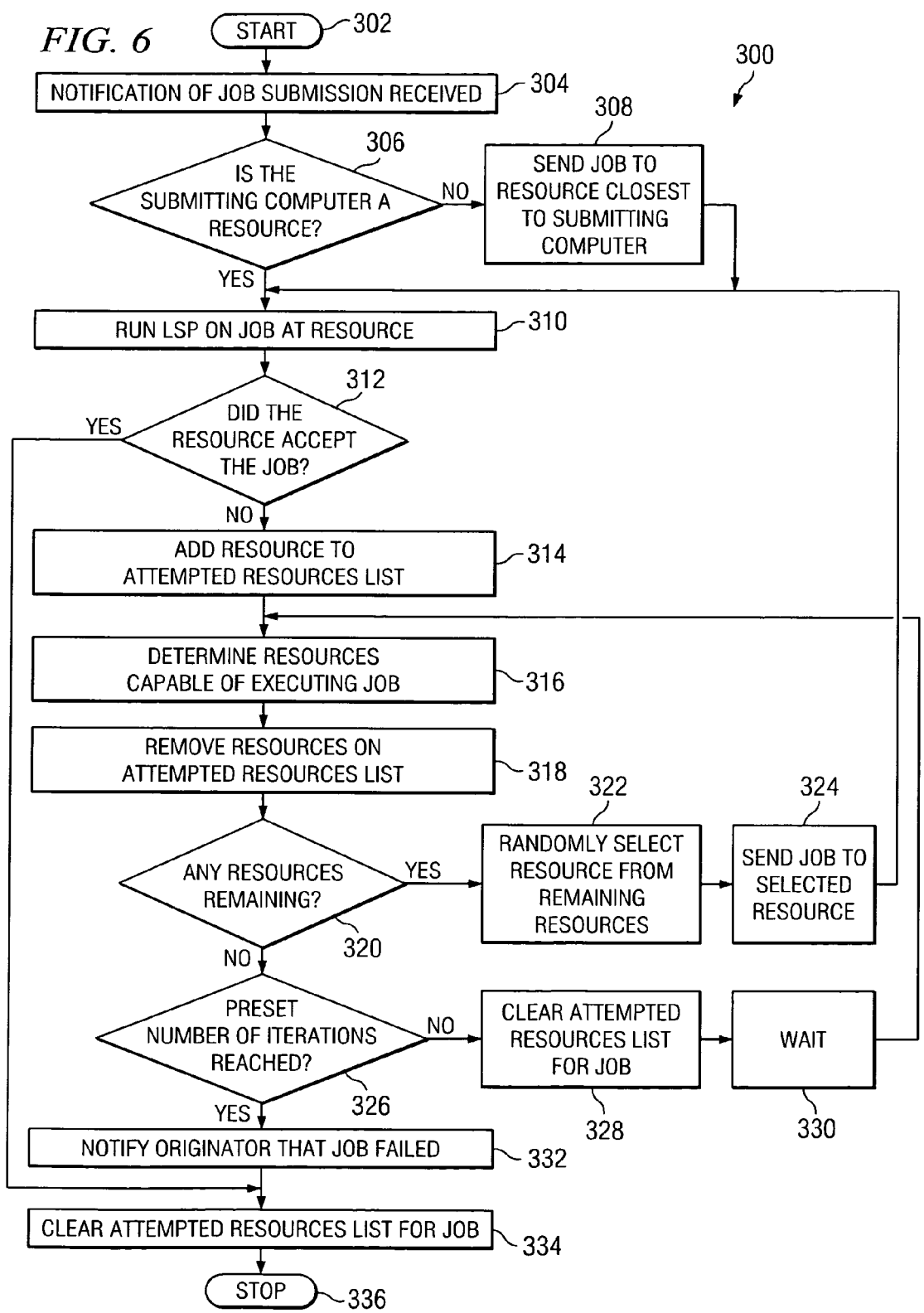

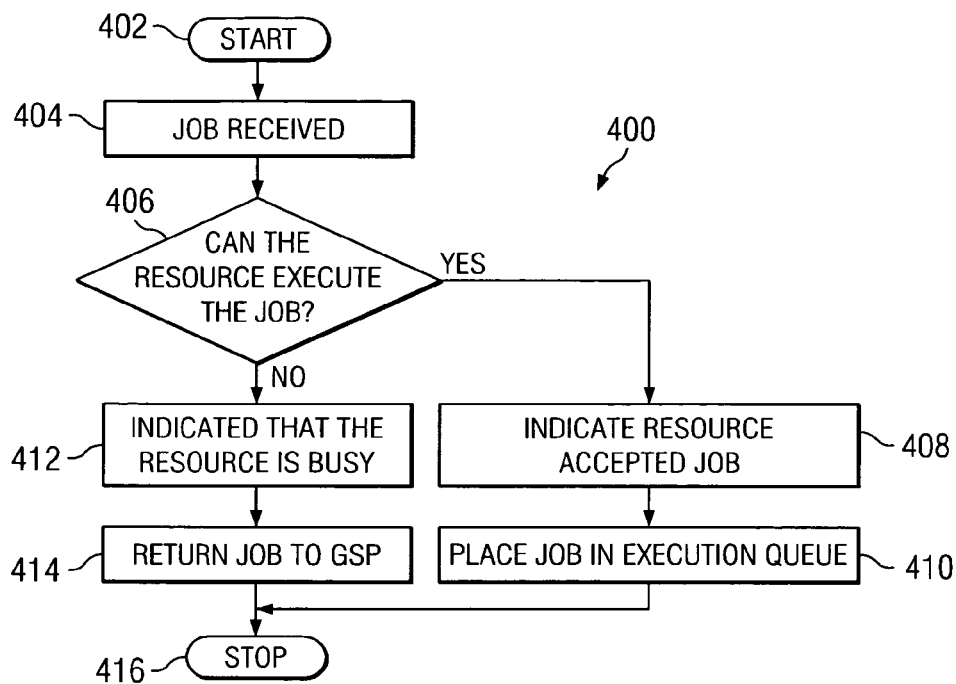
FIG. 8
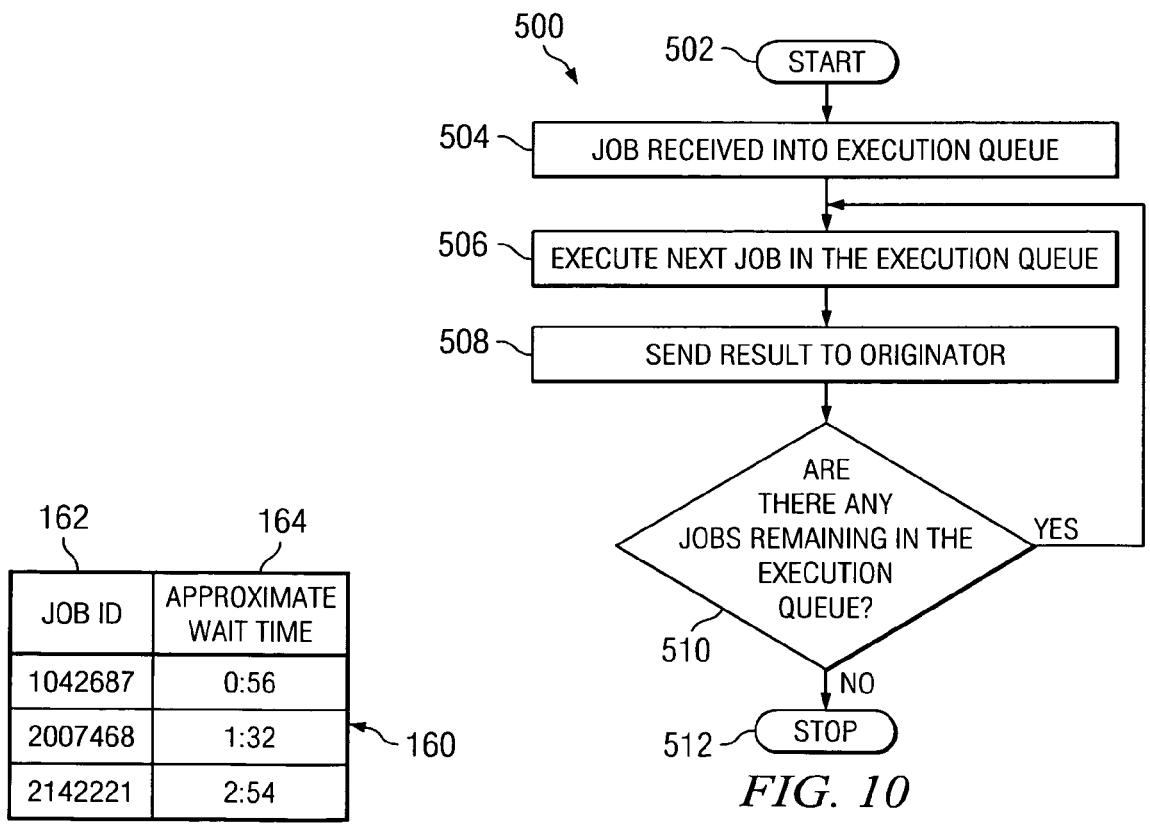
FIG. 9
FIG. 10

GRID NON-DETERMINISTIC JOB SCHEDULING

FIELD OF THE INVENTION

The present invention is directed generally to a scheduler for a grid computer network and specifically to a scheduler that does not need to keep track of the real-time state of the properties of each resource on the grid computer network.

BACKGROUND OF THE INVENTION

Recently, companies have begun to explore the possibilities of using grid computing networks (grids) to increase the companies' productivity. A grid comprises a plurality of computers that are networked together. Large or complex computations can be broken up into a plurality of smaller, more manageable jobs (jobs) by the grid. The jobs are then sent out to the computers within the grid for parallel processing. Each job has certain requirements to be executed, such as processor speed, memory, software, execution time, percent utilization, and so forth. The jobs can be routed to the resources depending on their requirements. As the individual computers complete their jobs, the grid reassembles the jobs into the completed result for the computation. The result is that the large or complex computations are processed in significantly less time than is possible on a single computer.

One of the important components of a grid is the scheduler. The scheduler is an algorithm that distributes the individual jobs for processing throughout the grid. The prior art grid schedulers acquire information about the current state of the resource properties on the gird. The information is used to create a real-time picture of the state of the resource properties on the grid. The prior art schedulers examine the real-time information to determine which resource can best execute the job. The prior art schedulers then distribute the job to the resource that can best execute the job. The process is repeated for every job in the grid.

Several problems are associated with the prior art scheduling method. One problem is that the collection of real-time data for the resources consumes a large amount of grid resources. The mechanism by which the scheduler collects and updates the real-time resource data consumes a large amount of network bandwidth between the scheduler and the resources. The mechanism utilizes processor time for the resources and the scheduler computer. Similarly, the mechanism also utilizes large amounts of memory for the resources and the scheduler computer. A scheduler that could reduce or eliminate the data gathering mechanism for the resources could apply the processing time and memory to more beneficial activities. Therefore, a need exists in the art for a scheduler that does not have to know the real-time state of the grid resources in order to distribute jobs to the resources.

Another problem associated with the prior art schedulers is that they are centralized. The prior art schedulers represent a bottleneck in the grid because all of the jobs on the grid must pass through a single computer. The idea behind grid computing is to eliminate the bottlenecks in the computer network by distributing the workload to a plurality of different computers. Decentralization allows the jobs to be completed more quickly than centralized networks. Decentralization is also advantageous because the productivity of the gird is not significantly affected when one of the grid computers goes offline. If the computer containing the prior art scheduler were to go offline, then the grid would have to cease operations until the scheduler came back online. With a decentralized scheduler, the grid would continue to operate when one computer running the scheduler goes offline because the scheduler would be on a plurality of computers. Therefore, a need exits in the art for a scheduler that is located on a plurality of computers on the grid.

SUMMARY OF THE INVENTION

The present invention, which meets the needs identified above, is a method for scheduling jobs in a grid computing environment without having to monitor the state of the resource on the gird. The software embodiment of the present invention comprises a Configuration Program (CP), a Global Scheduling Program (GSP), a Local Scheduling Program (LSP), and an Execution Program (EP). The CP creates and updates a resource table associated with the present invention. The resource table is a record of the state-independent properties of each resource and, therefore, does not contain a record of the current state of the properties of each resource on the grid. Jobs may be submitted anywhere on the grid to the GSP. The GSP receives jobs submitted to the grid and distributes the job to the closest resource. The resource then runs the LSP to determine if the resource can execute the job under the conditions specified in the job. The LSP either rejects or accepts the job based on the current state of the resource properties and informs the GSP of the acceptance or rejection.

If the job is accepted, the LSP places the job in the execution queue for execution by the EP. If the job is rejected, the GSP adds the resource ID to an attempted resources list. The GSP then searches the resource table for resources that have the properties required to execute the job and removes the resources in the attempted resources list from consideration. If any resources remain, then the GSP randomly selects one of the resources and sends the job to that selected resource. If no resources remain, then the GSP determines whether the job has gone through a preset number of iterations. If the job has not gone through a preset number of iterations, then the GSP enters a new iteration by sending the job to the resources in random order until a resource accepts the job or all the resources deny the job. If the job has gone through a preset number of iterations, the job is returned to the originator because the grid was unable to execute the job given the constraints specified in the job. Thus, the present invention is able to schedule jobs for a grid computing network without having to monitor the current state of the properties of each resource within the grid.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an illustration of the logic of the Global Scheduling Program (GSP) of the present invention;

FIG. 8 is an illustration of Local Scheduling Program (LSP) of the present invention;

FIG. 9 is an illustration of the Execution Queue of the present invention; and

FIG. 10 is an illustration of the Execution Program (EP) of the present invention.

DETAILED DESCRIPTION OF THE PREFERRED EMBODIMENT

As used herein, the term "accept" shall mean for a resource to have sufficient processing capability, memory, and other attributes to execute a job and for the resource to agree to execute a job.

As used herein, the term "analyze" shall mean to examine a resource and the resource properties.

As used herein, the term "attempted resources list" shall mean a list of resources that have rejected a job.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, tablet computers, and similar devices.

As used herein, the term "execute" shall mean to process a job into a finished result.

As used herein, the term "execution queue" shall mean a list of jobs that are awaiting execution at a single resource.

As used herein, the term "grid" shall mean a distributed computer network in which a processing task is broken up into a plurality of jobs, the jobs are executed by a plurality of computers, and the executed jobs are reassembled into a finished product.

As used herein, the term "job" shall mean a portion of a grid processing task which needs to be executed by a single resource.

As used herein, the term "reject" shall mean for a resource to decline acceptance of a job because the resource cannot execute the job within the parameters specified by the job.

As used herein, the term "resource" shall mean a computer on a grid that executes a job.

As used herein, the term "resource properties" shall mean the state-independent characteristics of a resource. Examples of resource properties include the resource processor speed, the amount of memory installed in the resource, the software installed on the resource, the resource IP address, the resource physical location, the resource logical location, the resource operating system, and the type of computer that the resource is.

As used herein, the term "resource table" shall mean a table that lists all of the resources on the grid and a plurality of resource properties associated with each resource.

As used herein, the term "scheduler" shall mean a computer algorithm for determining the distribution of pieces of a job in a grid.

As used herein, the term "state dependent" shall mean a characteristic in which the capacity of a resource property changes with time. State dependent properties include wait time, available processing power, current usage, and available memory.

As used herein, the term "state independent" shall mean a characteristic in which the capacity of a resource property does not change with time. State independent properties include processor power and total memory.

Figure 1:
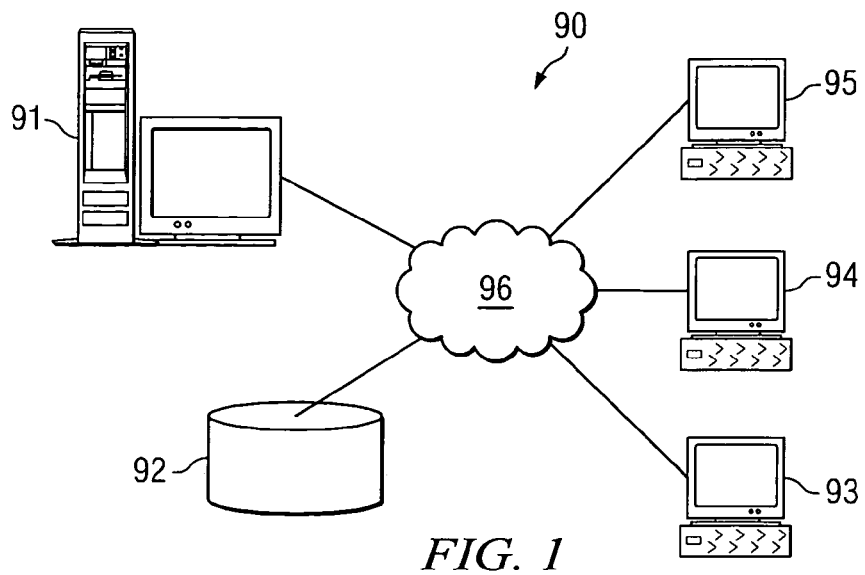
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
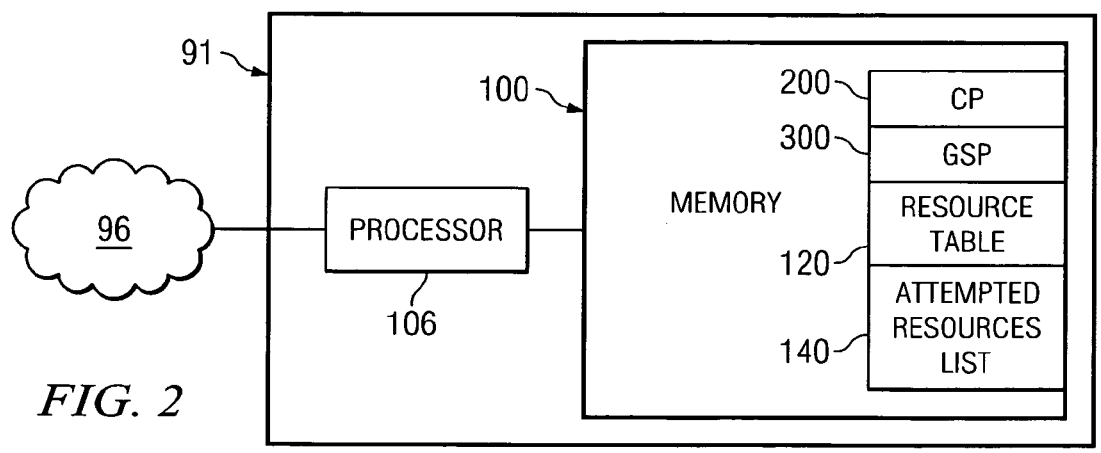
FIG. 2 is an illustration of a scheduling computer, including a memory and a processor, associated with the present invention.
Figure 3:
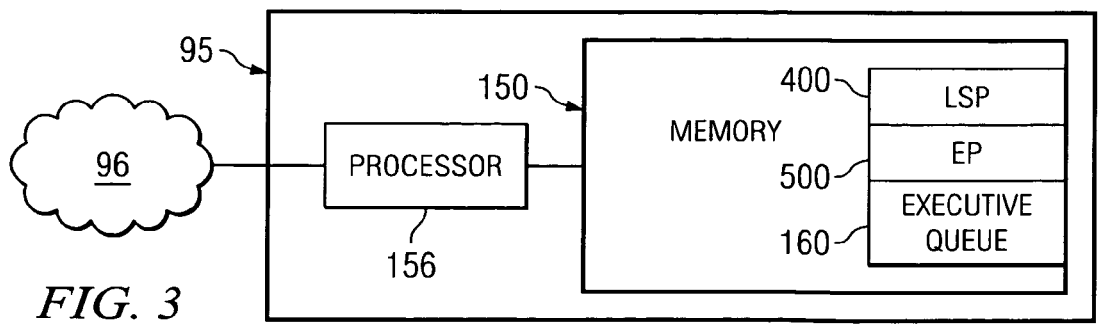
FIG. 3 is an illustration of a resource computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Configuration Program (CP) 200 and Global Scheduling Program (GSP) 300. CP 200 and GSP 300 described herein can be stored within the memory of any computer depicted in FIG. 1. Alternatively, CP 200 and GSP 300 can be stored in an external storage device such as a removable disk, a CD-ROM, or a USB storage device. Memory 100 is illustrative of the memory within one of the computers of FIG. 1. Memory 100 also contains Resource Table 120 and Attempted Resources List 140. The present invention may interface with Resource Table 120 and Attempted Resources List 140 through memory 100. As part of the present invention, the memory 100 can be configured with CP 200 and GSP 300. Processor 106 can execute the instructions contained in CP 200 and GSP 300. Processor 106 can communicate with other computers via network 96 using a protocol determined by a person of ordinary skill in the art, such as TCP/IP. Processor 106 and memory 100 are part of a computer such as server 91 in FIG. 1. Server 91 is a computer that schedules a job to a resource when the job is submitted to the grid. CP 200 and GSP 300 can be optionally located on a resource computer if a person of ordinary skill in the art desires further decentralization of the scheduling process. However, locating CP 200 and GSP 300 on a central computer is advantageous because only one copy of CP 200 and GSP 300 would need to be updated. Server 91 may also contain LSP 400 (See FIG. 3), EP 500 (See FIG. 3), and Execution Queue 160 (See FIG. 3) if server 91 is a resource on the grid.

Figures 4, 5, 7:
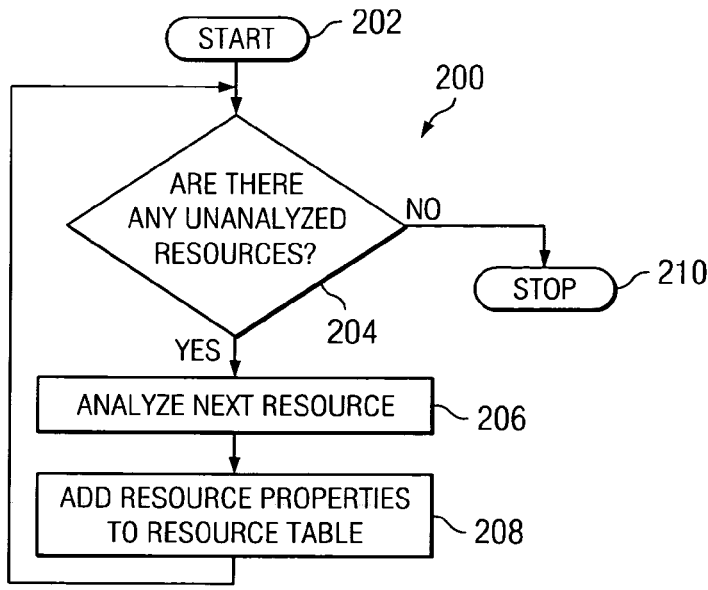
FIG. 4 is an illustration of the logic of the Configuration Program (CP) of the present invention.
FIG. 5 is an illustration of the Resource Table of the present invention.
FIG. 7 is an illustration of the Attempted Resources List of the present invention.

Resource Table 120 is a table of the resources available on the grid containing state-less resource properties that do not change with time. Examples of time-dependent resource properties include available memory, wait time until job is processed, and so forth. Thus, once a resource is added to Resource Table 120, the properties of the resource are not changed within Resource Table 120 unless there is a permanent change in the resource properties. An example of Resource Table 120 is illustrated in FIG. 5. Attempted Resource List 140 is a list of the jobs and the resources that rejected the jobs. An example of Attempted Resource List 140 is illustrated in FIG. 7.

In alternative embodiments, CP 200 and GSP 300 can be stored in the memory of other computers. Storing CP 200 and GSP 300 in the memory of other computers allows the processor workload to be distributed across a plurality of processors instead of a single processor. Further configurations of CP 200 and GSP 300 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

Referring to FIG. 2, the methodology of the present invention is also implemented on software by Local Scheduling Program (LSP) 400 and Execution Program (EP) 500. LSP 400 and EP 500 described herein can be stored within the memory of any computer depicted in FIG. 1. Alternatively, LSP 400 and EP 500 can be stored in an external storage device such as a removable disk, a CD-ROM, or a USB storage device. Memory 150 is illustrative of the memory within one of the computers of FIG. 1. Memory 150 also contains Execution Queue 160. The present invention may interface with Execution Queue 160 through memory 150. As part of the present invention, the memory 150 can be configured with LSP 400 and EP 500. Processor 156 can execute the instructions contained in LSP 400 and EP 500. Processor 156 and memory 150 are part of a computer such as local computer 95 in FIG. 1. LSP 400 and EP 500 are located on every resource on the grid, including local computer 95. Processor 156 can communicate with other computers via network 96 using a protocol determined by a person of ordinary skill in the art, such as TCP/IP.

Execution Queue 160 is a list of jobs that need to be executed on local computer 95. Execution Queue 160 also contains a list of the approximate wait time for each job. Each of the computers on the grid contains an Execution Queue 160. An example of Execution Queue 160 is illustrated in FIG. 9.

In alternative embodiments, LSP 400 and EP 500 can be stored in the memory of other computers. Storing LSP 400 and EP 500 in the memory of other computers allows the processor workload to be distributed across a plurality of processors instead of a single processor. Further configurations of LSP 400 and EP 500 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

FIG. 4 is an illustration of the logic of Configuration Program (CP) 200 of the present invention. CP 200 is a program that updates the resource table of the present invention. The resource table may be like Resource Table 120 depicted in FIG. 2. CP 200 starts (202) whenever a resource is added to the grid. CP 200 may also start when one of the state independent properties of a resource is changed (i.e. by physical addition of memory to a resource). CP 200 determines whether there are any unanalyzed resources (204). For the purposes of the present invention, a resource has not been analyzed if it is not present in the resource table or the properties of the resource have changed since the resource was added to the resource table. If there are unanalyzed resources, then CP 200 analyzes the next resource (206). In analyzing the next resource, CP 200 randomly selects one of the unanalyzed resources and determines the properties of the selected resource. CP 200 then adds the resource properties to the resource table (208) and returns to step 204. If at step 204 all of the resources have been analyzed, then CP 200 ends (210).

FIG. 5 is an illustration of Resource Table 120 of the present invention. Resource Table 120 is a table that lists the properties associated with each of the resources on the grid. The resource properties do not normally change with time and are, therefore, state-independent. Resource Table 120 contains resource ID 122, processor speed 124, memory 126, and operating system 128. Resource Table 120 may include the resource's IP address, the physical location of the resource, the logical location of the resource, and the computer type for the resource. Resource Table 120 may also include a description of the individual software applications present on each resource. Persons of ordinary skill in the art are aware of other fields that Resource Table 120 may contain.

FIG. 6 is an illustration of the logic of Global Scheduling Program (GSP) 300. GSP 300 is a program that controls the routing of jobs to resources. GSP 300 starts (302) when the grid comes online. GSP 300 receives notification that a job has been submitted to the grid (304). The job may be submitted on any computer connected to the gird. GSP 300 then determines whether the computer submitting the job is a resource (306). A resource is a computer on the grid that can execute a job. Jobs can be submitted by non-resource computers that are not permanently connected to the grid such as laptops and computers using a dial-up connection. If GSP 300 determines that the submitting computer is a resource, then GSP 300 proceeds to step 310. If GSP 300 determines that the submitting computer is a resource, then GSP 300 sends the job to the resource that is closest in proximity to the submitting computer (308). GSP 300 then waits for the resource with the job to run LSP 400 (310). When the resource responds after running LSP 400, GSP 300 proceeds to step 312.

At step 312, GSP 300 determines whether the resource accepted the job (312). If the resource accepted the job, the GSP 300 proceeds to step 334. If the resource rejected the job, then GSP 300 adds the resource ID and job ID to the attempted resources list (314). The attempted resources list may be like Attempted Resources List 140 depicted in FIGS. 2 and 7. GSP 300 then determines which resources are capable of executing the job (316). Each job has certain requirements as to the resource properties such as processor speed, memory, operating system, required software, as so forth. In determining which resources are capable of executing the job, GSP 300 looks to the resource table and eliminates from consideration the resources that lack sufficient resources to execute the job. The resource table may be like Resource Table 120 depicted in FIGS. 2 and 5. GSP 300 also eliminates from consideration the resources that are on the attempted resources list (318). GSP 300 then proceeds to step 320.

At step 320, GSP 300 determines whether there are any resources remaining after the resources with insufficient properties and the resource on the attempted resources list have been removed from consideration (320). If there are not any resources remaining, then GSP 300 proceeds to step 326. If there are resources remaining, then GSP 300 randomly selects one of the resources from the remaining resource (322). GSP 300 then sends the job to the selected resource (324) and returns to step 310.

At step 326, GSP 300 determines whether the preset number of iterations has been reached (326). When a job is submitted to the grid, the originator includes a preset number of times that the grid tries to execute the job and a wait time between tries before the job is returned to the submitting computer. Each iteration represents an attempt by every qualified resource on the grid to execute the job as specified. If the present number of iterations has not been reached, then GSP 300 clears the attempted resources list for the job (328). GSP 300 then waits for an amount of time specified by the job originator (330) and returns to step 316. Returning to step 326, if the present number of iterations has been reached, then GSP 300 notifies the originator that the job has failed (332).

GSP 300 then clears the attempted resources list for the present job (334) and ends (336).

FIG. 7 is an illustration of Attempted Resources List 140. Attempted Resources List 140 is a list of all of the jobs pending on the grid that have not been accepted and the resources that have rejected the jobs. Attempted Resources List 140 comprises job ID 142 and resource ID 144. Persons of ordinary skill in the art are aware of other fields that Attempted Resources List 140 may contain.

FIG. 8 is an illustration of the logic of Local Scheduling Program (LSP) 400. LSP 400 is a program that runs on the resource and determines if the current resource workload will allow the resource to execute the job. LSP 400 starts (402) whenever the resource is online with the grid. LSP 400 receives the job from GSP 300 (404). LSP 400 then determines if the resource can execute the job (406). Each job has certain requirements to be executed, such as processor speed, memory, software, execution time, percent utilization, and so forth. A specific resource may have sufficient processing speed, memory, and software to execute a job, but may have too many other jobs queued to execute the present job in the specified execution time. Alternatively, a resource may have sufficient properties to execute the job but may not have a low enough percent utilization to execute the job. Therefore, in order to determine if the resource can execute the job, LSP examines the resource properties as well as the execution queue. The execution queue may be like Execution Queue 160 depicted in FIGS. 3 and 9.

If at step 406, LSP 400 determines that the resource can execute the job, then LSP 400 indicates to GSP 300 that the resource has been accepted (408). LSP 400 then places the job in the execution queue (410) and ends (416). If at step 406, LSP 400 determines that the resource cannot execute the job, then LSP 400 rejects the job, indicating to GSP 300 that the resource is busy (412). LSP 400 then returns the job to GSP 300 (414) and ends (416).

FIG. 9 is an illustration of Execution Queue 160 associated with the local resource. Execution Queue 160 is an ordered list of job IDs 162 and the approximate waiting time 164 until each job is executed. Persons of ordinary skill in the art are aware of other fields that Execution Queue 160 may contain.

FIG. 10 is an illustration of the logic of Execution Program (EP) 500. EP 500 is a program that runs on the resource and executes the jobs. EP 500 starts (502) whenever the resource is online with the grid. EP 500 receives a job into the execution queue (504). The execution queue may be like Execution Queue 160 depicted in FIGS. 3 and 9. EP 500 executes the next job in the execution queue (506). EP 500 then sends the result of the executed job back to the originator or other destination as specified in the job (508). EP 500 then determines if there are any jobs remaining in the execution queue (510). If there are jobs remaining in the execution queue, then EP 500 returns to step 506. If there are not any jobs remaining in the execution queue, then EP 500 ends (512).

While the present invention is described in terms of a Global Scheduling Program (GSP) and a Local Scheduling Program (LSP), persons of ordinary skill in the art will appreciate that an alternative embodiment of the present invention allows the grid scheduler to be completely decentralized. The present invention can be completely decentralized by installing a GSP and LSP on each resource and running the GSP for each individual job. A person of ordinary skill in the art could optionally combine the GSP and the LSP into a single program and run that program on each job submitted to the grid. In the present embodiment, the loss of a single resource would not significantly decrease the ability of any other resource to accept jobs into the grid or schedule the execution of jobs on the grid. Thus, the present embodiment represents a completely decentralized embodiment of the present invention.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for scheduling a job on a grid, the method comprising:

maintaining a record of state-independent properties of each resource in the grid;

sending a job, submitted to the grid by a computer, to a resource that is closest in proximity to the submitting computer;

determining by the resource, whether it can execute the job under the conditions specified in the job;

responsive to the determination that the resource can not execute the job under the conditions specified in the job, rejecting the job;

responsive to rejection of the job, determining from the said record whether any of the other resources have the properties required to execute the job;

responsive to the determination that one or more of the other resources have the properties required to execute the job, sending the job to a resource at random;

responsive to the determination that none of the other resources have the properties required to execute the job, determining whether the job has gone through a predefined number of iterations;

responsive to the determination that the job has not gone through a predefined number of iterations, entering a new iteration by sending the job to a resource at random; and responsive to the determination that the job has gone through a predefined number of iterations, notifying the submitting computer that the job has failed.

* * * * *